United States Patent
Kim et al.

(10) Patent No.: US 9,541,801 B2
(45) Date of Patent: Jan. 10, 2017

(54) LIQUID CRYSTAL DISPLAY PANEL WHEREIN HEIGHTS OF SPACERS WITHIN A CENTRAL REGION ARE LARGER THAN HEIGHTS OF SPACERS WITHIN A PERIPHERAL REGION AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Jaikwang Kim, Beijing (CN); Yongjun Yoon, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 124 days.

(21) Appl. No.: 14/382,155

(22) PCT Filed: Dec. 17, 2013

(86) PCT No.: PCT/CN2013/089670
§ 371 (c)(1),
(2) Date: Aug. 29, 2014

(87) PCT Pub. No.: WO2015/027629
PCT Pub. Date: Mar. 5, 2015

(65) Prior Publication Data
US 2015/0293393 A1 Oct. 15, 2015

(30) Foreign Application Priority Data
Aug. 30, 2013 (CN) .......................... 2013 1 0388858

(51) Int. Cl.
*G02F 1/1339* (2006.01)
*G02F 1/1333* (2006.01)

(52) U.S. Cl.
CPC . *G02F 1/13394* (2013.01); *G02F 2001/13396* (2013.01); *G02F 2001/13398* (2013.01); *G02F 2001/133388* (2013.01)

(58) Field of Classification Search
CPC .................. G02F 1/13394; G02F 2001/13396; G02F 2001/133388
(Continued)

(56) References Cited

U.S. PATENT DOCUMENTS 8,031,275 B2 10/2011 Lee
2002/0005929 A1 1/2002 Imabayashi et al.
(Continued)

FOREIGN PATENT DOCUMENTS

CN 101315496 A 12/2008
CN 101452156 A 6/2009
(Continued)

OTHER PUBLICATIONS

Search Report issued in International Application No. PCT/CN2013/089670, thirteen (13) pages.

*Primary Examiner* — Paul Lee
(74) *Attorney, Agent, or Firm* — Nath, Goldberg & Meyer; Joshua B. Goldberg; Christopher Thomas

(57) ABSTRACT

The embodiment of the present invention provides a liquid crystal display panel comprising an array substrate and an opposite substrate arranged opposite to each other, and spacers provided between the array substrate and the opposite substrate; the liquid crystal display panel includes a central region and a peripheral region; heights of the spacers within the central region without extending and contracting are set as a first height; heights of the spacers within the
(Continued)

peripheral region without extending and contracting are set as second heights; and the first height is larger than the second heights.

12 Claims, 4 Drawing Sheets

(58) Field of Classification Search
USPC .................................................. 349/155–157
See application file for complete search history.

(56) References Cited

U.S. PATENT DOCUMENTS

| 2004/0114087 A1* | 6/2004 | Cho ................... G02F 1/133514 |
| | | 349/155 |
| 2009/0046239 A1* | 2/2009 | Watanabe ........... G02F 1/13394 |
| | | 349/157 |

FOREIGN PATENT DOCUMENTS

| CN | 101526701 A | 9/2009 |
| CN | 103163690 A | 6/2013 |
| JP | 2010197795 A | 9/2010 |
| KR | 20070038852 A | 4/2007 |

\* cited by examiner

LIQUID CRYSTAL DISPLAY PANEL WHEREIN HEIGHTS OF SPACERS WITHIN A CENTRAL REGION ARE LARGER THAN HEIGHTS OF SPACERS WITHIN A PERIPHERAL REGION AND DISPLAY DEVICE

This is a National Phase Application filed under 35 U.S.C. 371 as a national stage of PCT/CN2013/089670, filed Dec. 17, 2013, and claims priority benefit from Chinese Application No. 201310388858.5, filed Aug. 30, 2013, the content of each of which is hereby incorporated by reference in its entirety.

FIELD OF THE INVENTION

The present invention relates to the field of display technology, and particularly to a liquid crystal display panel and a display device.

BACKGROUND OF THE INVENTION

A liquid crystal display panel mainly comprises an array substrate and an opposite substrate arranged opposite to each other, and liquid crystal molecules between the array substrate and the opposite substrate. Here, as shown in FIG. 1a, spacers 3 with the same height are provided between the array substrate 1 and the opposite substrate 2 to maintain a certain cell gap between both substrates.

Currently, the liquid crystal display panel is developing towards light, thin, and large-size design, the cell gap in the central region of the liquid crystal display panel is likely to decrease under the action of external pressure and gravity, and as a result, as shown FIG. 1b, the cell gap of the entire liquid crystal display panel becomes non-uniform, which leads to non-uniform brightness of the liquid crystal display panel in a dark state.

SUMMARY OF THE INVENTION

An embodiment of the present invention provides a liquid crystal display panel, which may avoid the problem of non-uniform brightness of the liquid crystal display panel in a dark state.

The liquid crystal display panel provided by the embodiment of the present invention comprises an array substrate and an opposite substrate arranged opposite to each other, and spacers provided between the array substrate and the opposite substrate; wherein the liquid crystal display panel is divided into a central region which includes a center of a diagonal of the liquid crystal display panel and a region around the center of the diagonal and a peripheral region which is a region of the liquid crystal display panel other than the central region;

heights of the spacers within the central region without extending and contracting are set as a first height;

heights of the spacers within the peripheral region without extending and contracting are set as second heights; and the first height is larger than the second heights.

In the above liquid crystal display panel provided by the embodiment of the present invention, compared to the existing liquid crystal display panel, since the first height of the spacers within the central region of the liquid crystal display panel is larger than the second heights of the spacers within the peripheral region, a supporting force provided by the spacers within the central region of the liquid crystal display panel is larger than that provided by the spacers within the peripheral region after the array substrate and the opposite substrate are aligned to form a cell, which can prevent a cell gap of the central region of the liquid crystal display panel from decreasing, due to external forces or gravity, relative to a cell gap of the peripheral region of the liquid crystal display panel, allows the entire liquid crystal display panel a uniform cell gap, and further ensures uniform brightness of the liquid crystal display panel in a dark state.

Preferably, for ease of implementation, in the above liquid crystal display panel provided by the embodiment of the present invention, the peripheral region is divided into a plurality of ring-shaped sub-regions surrounding the central region along a direction from the central region of the liquid crystal display panel toward outer edge of periphery of the liquid crystal display panel, and the spacers within the same ring-shaped sub-region have the same second height.

Preferably, for ease of implementation, in the above liquid crystal display panel provided by the embodiment of the present invention, the second heights of the spacers within the respective ring-shaped sub-regions decrease gradually along the direction from the central region of the liquid crystal display panel toward the outer edge of the periphery of the liquid crystal display panel.

Preferably, for ease of implementation, in the above liquid crystal display panel provided by the embodiment of the present invention, a height difference between the second heights of the spacers respectively within two adjacent ring-shaped sub-regions is in a range of 2% to 3%; and a height difference between the first height of the spacers within the central region and the second height of the spacers within a ring-shaped sub-region immediately adjacent to the central region is in a range of 2% to 3%.

Preferably, for ease of implementation, in the above liquid crystal display panel provided by the embodiment of the present invention, a height difference between the first height of the spacers within the central region and the second height of the spacers within a ring-shaped sub-region farthest from the central region is 10%.

Preferably, for ease of implementation, in the above liquid crystal display panel provided by the embodiment of the present invention, widths of all of the ring-shaped sub-regions are the same.

Preferably, in the above liquid crystal display panel provided by the embodiment of the present invention, widths of the respective ring-shaped sub-regions increase or decrease gradually along the direction from the central region of the liquid crystal display panel toward the outer edge of the periphery of the liquid crystal display panel.

Preferably, in the above liquid crystal display panel provided by the embodiment of the present invention, the spacers are arranged on the array substrate; or, the spacers are arranged on the opposite substrate.

Preferably, in the above liquid crystal display panel provided by the embodiment of the present invention, the central region is a region which centers on the center of the diagonal of the liquid crystal display panel and has a shape similar to the shape of the liquid crystal display panel, and the peripheral region is divided into a plurality of ring-shaped sub-regions surrounding the central region.

An embodiment of the present invention further provides a display device, comprising the liquid crystal display panel provided by the embodiment of the present invention.

Figure 1A:
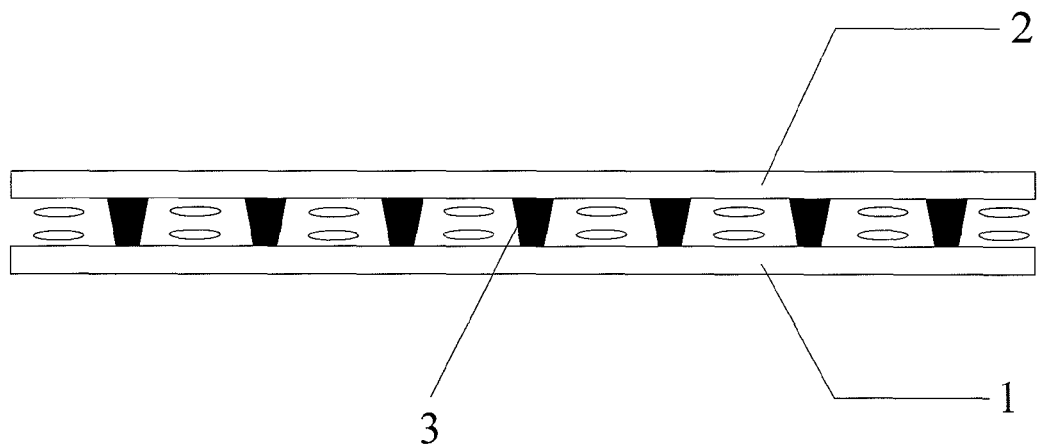
FIGS. 1a and 1b are schematic diagrams of a structure of an existing liquid crystal display panel, respectively.
Figure 1B:
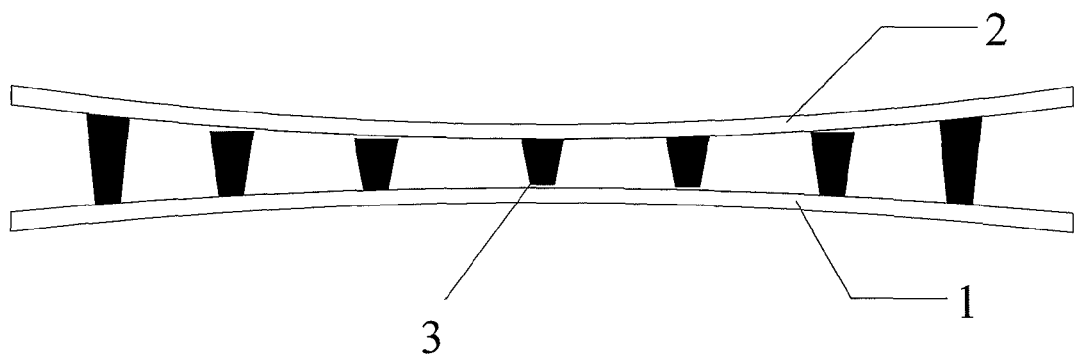

REFERENCE NUMERALS 01, array substrate; 02, opposite substrate; A, central region; B, peripheral region; h1, first height; h2, second height; R, ring-shaped sub-region.

DETAILED DESCRIPTION OF THE EMBODIMENTS

The specific implementations of a liquid crystal display panel and a display device provided by embodiments of the present invention will be described in detail below in conjunction with the accompanying drawings.

Shapes and sizes of regions in the accompanying drawings do not reflect true scale of the liquid crystal display panel, but merely intend to explain the contents of the present invention schematically.

Figure 2A:
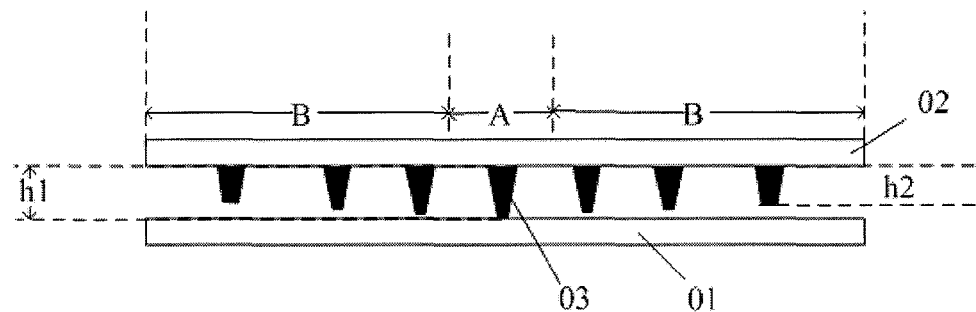
FIG. 2a is a schematic diagram of a structure of a liquid crystal display panel provided by an embodiment of the present invention.

An embodiment of the present invention provides a liquid crystal display panel, as shown in FIG. 2a, comprising an array substrate 01 and an opposite substrate 01 arranged opposite to each other, and spacers 03 provided between the array substrate 01 and the opposite substrate 02.

The liquid crystal display panel is divided into a central region A and a peripheral region B; the central region A includes a center of a diagonal of the liquid crystal display panel and a region around the center of the diagonal, and the peripheral region B is a region of the liquid crystal display panel other than the central region A; that is, the peripheral region B in the embodiment of the present invention includes a part of display region and all non-display region of a liquid crystal display panel in the prior art;

heights of the spacers 03 within the central region A without extending and contracting are set as a first height h1;

heights of the spacers 03 within the peripheral region B without extending and contracting are set as second heights h2; and the first height h1 is larger than the second heights h2.

In the above liquid crystal display panel provided by the embodiment of the present invention, compared to the existing liquid crystal display panel, since the first height h1 of the spacers 03 within the central region A of the liquid crystal display panel is larger than the second heights h2 of the spacers 03 within the peripheral region B, a supporting force provided by the spacers 03 within the central region A of the liquid crystal display panel is larger than that provided by the spacers 03 within the peripheral region B after the array substrate and the opposite substrate are aligned to form a cell, which can prevent a cell gap of the central region A of the liquid crystal display panel from decreasing, due to external forces or gravity, relative to a cell gap of the peripheral region B of the liquid crystal display panel, allows the entire liquid crystal display panel a uniform cell gap, and further ensures uniform brightness of the liquid crystal display panel in a dark state.

Figure 2B:
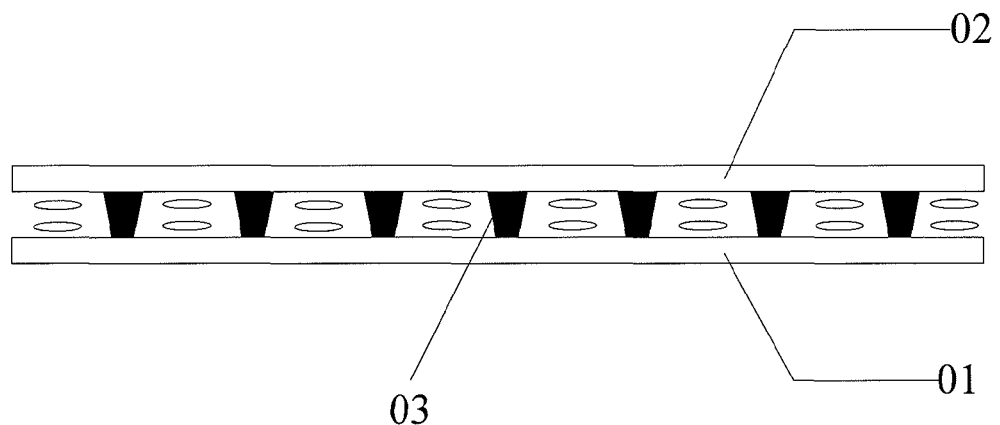
FIG. 2b is another schematic diagram of the structure of the liquid crystal display panel provided by the embodiment of the present invention.

It should be noted that, the schematic diagram of the structure of the liquid crystal display panel shown in FIG. 2a is a schematic diagram illustrating a structure of the above liquid crystal display panel provided by the embodiment of the present invention before the array substrate 01 and the opposite substrate 02 are aligned to form a cell. Here, the spacers 03 within the central region A of the liquid crystal display panel and the spacers 03 within the peripheral B are in a natural state without extending and contracting. At this point, the first height h1 of the spacers 03 within the central region A of the liquid crystal display panel is larger than the second heights h2 of the spacers 03 within the peripheral region B. After the array substrate 01 and the opposite substrate 02 are aligned to form a cell, the structure of the above liquid crystal display panel provided by the embodiment of the present invention is shown as FIG. 2b. At this time, the cell gap between the array substrate 01 and the opposite substrate 02 is uniform, that is, the cell gap in the central region A of the liquid crystal display panel is equal to that in the peripheral region B.

Further, in the above liquid crystal display panel provided by the embodiment of the present invention, the height of a spacer 03 without extending and contracting is a height of the spacer 03 from bottom to top of the spacer in a natural state before the array substrate 01 and the opposite substrate 02 are aligned to form a cell.

Specifically, in the above liquid crystal display panel provided by the embodiment of the present invention, a color filter may be provided on the opposite substrate 02 to form a color filter substrate. Apparently, a color filter (COA, CF on Array) may be provided on the array substrate 01, which is not limited herein.

Further, in the above liquid crystal display panel provided by the embodiment of the present invention, the spacers 03 may be arranged on the array substrate 01; or the spacers 03 may be arranged on the opposite substrate 02, which is not limited herein.

Figure 3:
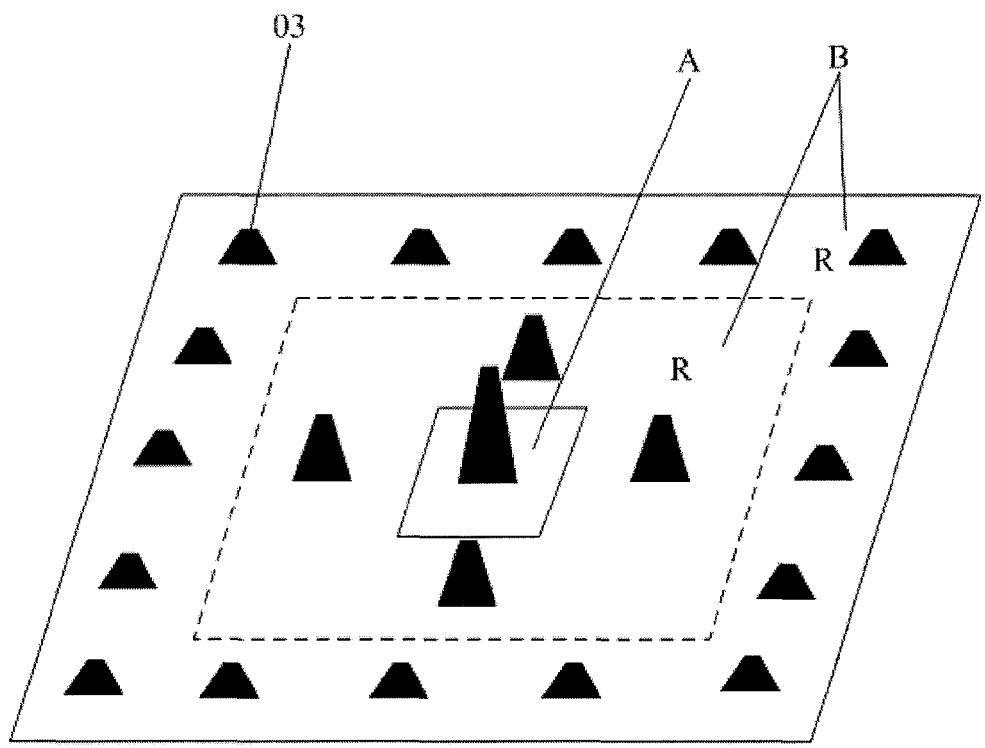
FIG. 3 is still another schematic diagram of the structure of the liquid crystal display panel provided by the embodiment of the present invention.

Preferably, in the above liquid crystal display panel provided by the embodiment of the present invention, as shown in FIG. 3, the peripheral region B may be divided into a plurality of ring-shaped sub-regions R surrounding the central region A along a direction from the central region A of the liquid crystal display panel toward outer edge of periphery of the liquid crystal display panel, and the spacers 03 within the same ring-shaped sub-region R have the same second height h2.

Figure 4A:
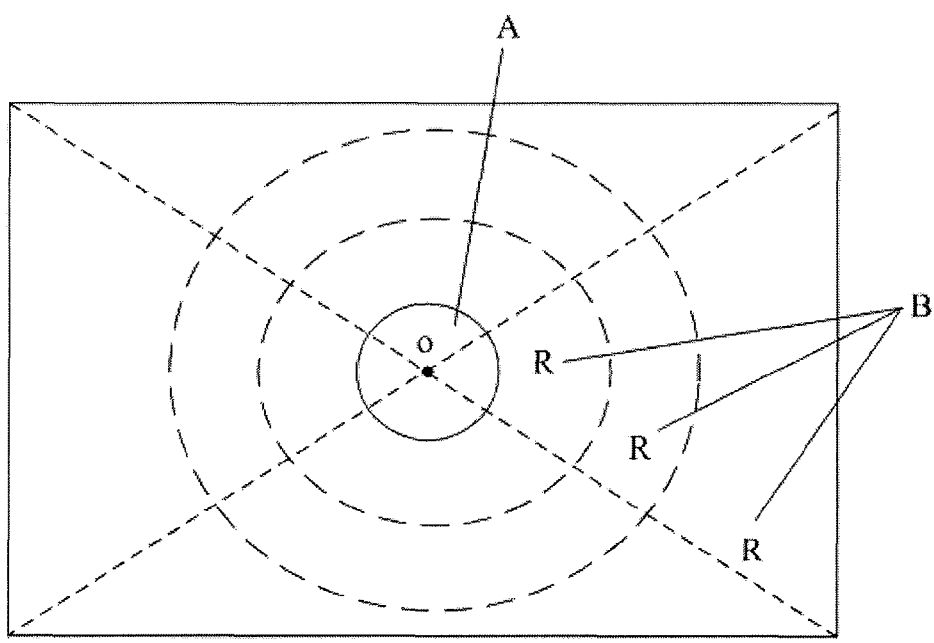
FIGS. 4a to 4c are schematic diagrams illustrating region divisions of a liquid crystal display panel provided by an embodiment of the present invention, respectively.
Figure 4B:
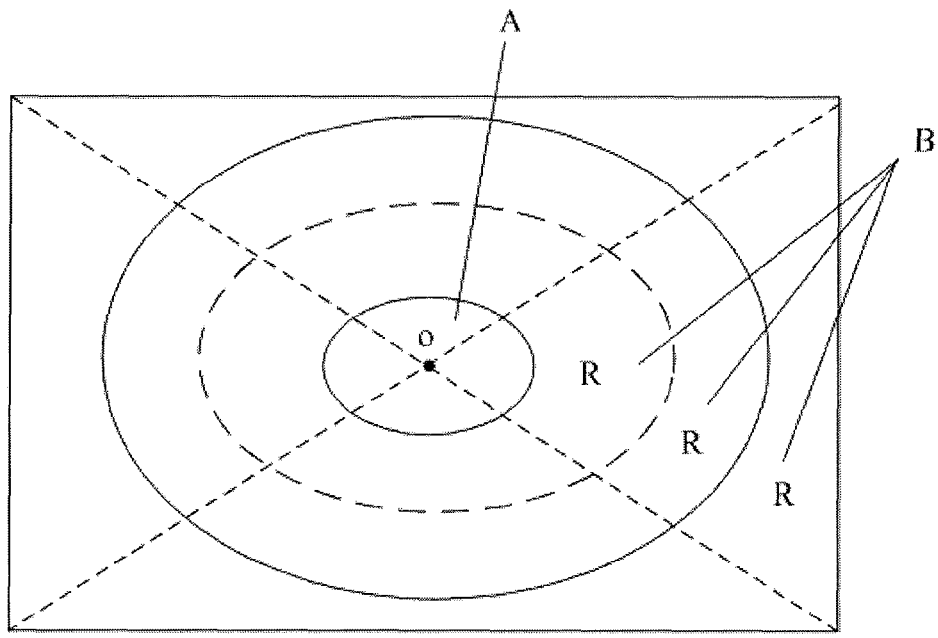
Figure 4C:
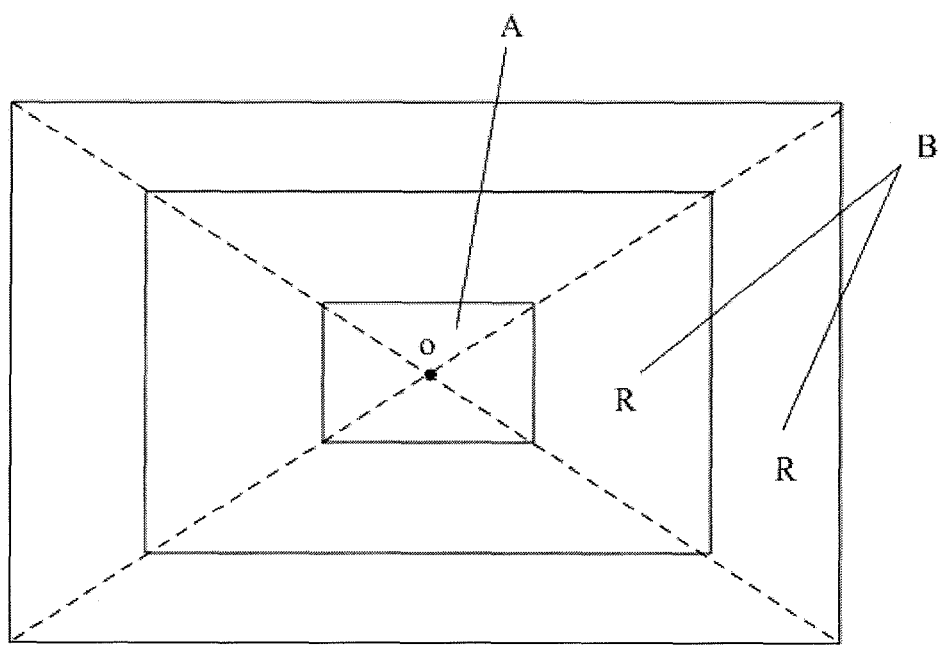

Specifically, in specific implementations, as shown in FIG. 4a, the central region A may be a circular region which centers on the center o of the diagonal of the liquid crystal display panel, and then the peripheral region B may be divided into a plurality of circular ring-shaped sub-regions R surrounding the central region A which is circular. Optionally, as shown in FIG. 4b, the central region A may also be an oval region which centers on the center o of the diagonal of the liquid crystal display panel, and then the peripheral region B may be divided into a plurality of oval ring-shaped sub-regions R surrounding the central region A which is oval. Optionally, as shown in FIG. 4c, the central region A may be a region which centers on the center o of the diagonal of the liquid crystal display panel and has a shape similar to the shape of a surface of the liquid crystal display panel. For example, the surface of the liquid crystal display panel typically has a rectangular shape, and in this case, the central region A may be a rectangular region which centers on the center o of the diagonal of the liquid crystal display panel, and the peripheral region B may be divided into a plurality of rectangular ring-shaped sub-regions R surrounding the central region A which is rectangular. Of course, in specific implementations, specific shapes of the central regions and the respective ring-shaped sub-regions may be other shapes that can implement the technical solutions of the present invention, which is not limited herein.

Preferably, for ease of implementation, in the above liquid crystal display panel provided by the embodiment of the present invention, as shown in FIG. 3, the second heights h2 of the spacers 03 within the respective ring-shaped sub-regions R decrease gradually along the direction from the central region A of the liquid crystal display panel toward the outer edge of the periphery of the liquid crystal display panel. That is, the farther a ring-shaped sub-region R is away from the central region A, the smaller the second height h2 of the spacers 03 within the ring-shaped sub-region R is.

Preferably, in the above liquid crystal display panel provided by the embodiment of the present invention, a height difference between the second heights h2 of the spacers 03 respectively within any two adjacent ring-shaped sub-regions R is in a range of 2% to 3%; and there is also a height difference of 2% to 3% between the first height h1 of the spacers 03 within the central region A and the second height h2 of the spacers 03 within the ring-shaped sub-region R immediately adjacent to the central region A.

Preferably, in the above liquid crystal display panel provided by the embodiment of the present invention, there is a height difference of 10% between the first height h1 of the spacers 03 within the central region A and the second height h2 of the spacers 03 within the ring-shaped sub-region R farthest from the central region A.

Specifically, taking an ADS mode liquid crystal display panel as an example, in a normal state of the liquid crystal display panel, the cell gap between the array substrate and the opposite substrate is generally in a range of 2.6 µm to 6.0 µm. When arranging the spacers in the respective regions, it is preferable that a height difference between the first height of the spacers within the central region and the second height of the spacers within the ring-shaped sub-region immediately adjacent to the outer edge of the liquid crystal display panel is controlled to be approximately in a range of 0.4 µm to 0.7 µm; it is preferable that a difference between the second heights of the spacers respectively within two adjacent ring-shaped sub-regions is controlled to be in a range of 0.05 µm to 0.14 µm; and it is preferable that a difference between the first height of the spacers within the central region and the second height of the spacers within the ring-shaped sub-region immediately adjacent to the central region is controlled to be in a range of 0.05 µm to 0.14 µm.

Preferably, for ease of implementation, in the above liquid crystal display panel provided by the embodiment of the present invention, widths of all of the ring-shaped sub-regions R are the same. Of course, in specific implementations, the widths of the ring-shaped sub-regions R may be different, for example, the widths of the respective ring-shaped sub-regions R may increase or decrease gradually along the direction from the central region of the liquid crystal display panel toward the outer edge of the periphery of the liquid crystal display panel, which is not limited herein.

In specific implementations, a halftone or gray-tone mask may be adopted to prepare the spacers in the above liquid crystal display panel provided by the embodiment of the present invention. In the process of preparation, lighttight regions in the mask correspond to the spacers to be formed in the central region A, partially-photic regions correspond to the spacers to be formed in the peripheral region B, and completely-photic regions correspond to other regions than all of the spacers. Further, it is preferable that transmittance of the partially-photic regions in the mask is generally controlled to be in a range of 20% to 50%.

Based on the same inventive concept, an embodiment of the present invention provides a display device, comprising the above-described liquid crystal display panel provided by the embodiment of the present invention. The display device may be any product or component with a display function, such as a mobile phone, a tablet computer, a television, a display, a notebook computer, a digital photo frame, a navigator or the like. The implementation of the display device may refer to the above embodiment of the liquid crystal display panel, and is not elaborated herein.

The embodiment of the present invention provides a liquid crystal display panel comprising an array substrate and an opposite substrate arranged opposite to each other, and spacers provided between the array substrate and the opposite substrate; the liquid crystal display panel includes a central region and a peripheral region; the central region includes a center of a diagonal of the liquid crystal display panel and a region around the center of the diagonal, and the peripheral region is a region of the liquid crystal display panel other than the central region; heights of the spacers within the central region without extending and contracting are set as a first height; heights of the spacers within the peripheral region without extending and contracting are set as second heights; and the first height is larger than the second heights. Compared to the existing liquid crystal display panel, since the first height of the spacers within the central region of the liquid crystal display panel is larger than the second heights of the spacers within the peripheral region, a supporting force provided by the spacers within the central region of the liquid crystal display panel is larger than that provided by the spacers within the peripheral region after the array substrate and the opposite substrate are aligned to form a cell, which can prevent a cell gap of the central region of the liquid crystal display panel from decreasing, due to external forces or gravity, relative to a cell gap of the peripheral region of the liquid crystal display panel, allows the entire liquid crystal display panel a uniform cell gap, and further ensures uniform brightness of the liquid crystal display panel in a dark state.

Apparently, for those skilled in the art, various modifications and variations may be made without departing from the spirit and scope of the present invention. Thus, if these modifications and variations fall within the scope of claims of the present invention and equivalents thereof, the present invention intends to cover these modifications and variations.

The invention claimed is:

1. A liquid crystal display panel, comprising an array substrate and an opposite substrate arranged opposite to each other, and spacers provided between the array substrate and the opposite substrate, wherein:

the liquid crystal display panel is divided into a central region and a peripheral region; the central region includes a center of a diagonal of the liquid crystal display panel and a region around the center of the diagonal, and the peripheral region is a region of the liquid crystal display panel other than the central region;

heights of the spacers within the central region without extending and contracting are set as a first height;

heights of the spacers within the peripheral region without extending and contracting are set as second heights; and the first height is larger than the second heights;

wherein after the array substrate and the opposite substrate are aligned to form a cell, the spacers within the central region and the spacers within the peripheral region have the same height, and wherein the peripheral region is divided into a plurality of ring-shaped sub-regions surrounding the central region along a direction from the central region of the liquid crystal display panel toward outer edge of periphery of the liquid crystal display panel, and the spacers within the same ring-shaped sub-region have the same second height and the second heights of the spacers within the respective ring-shaped sub-regions decrease gradually along the direction from the central region of the liquid crystal display panel toward the outer edge of the periphery of the liquid crystal display panel.

2. The liquid crystal display panel according to claim 1, wherein, a height difference between the second heights of the spacers respectively within two adjacent ring-shaped sub-regions is in a range of 2% to 3%; and a height difference between the first height of the spacers within the central region and the second height of the spacers within a ring-shaped sub-region immediately adjacent to the central region is in a range of 2% to 3%.

3. The liquid crystal display panel according to claim 1, wherein, a height difference between the first height of the spacers within the central region and the second height of the spacers within a ring-shaped sub-region farthest from the central region is 10%.

4. The liquid crystal display panel according to claim 1, wherein, widths of all of the ring-shaped sub-regions are the same.

5. The liquid crystal display panel according to claim 1, wherein, widths of the respective ring-shaped sub-regions increase gradually along the direction from the central region of the liquid crystal display panel toward the outer edge of the periphery of the liquid crystal display panel.

6. The liquid crystal display panel according to claim 1, wherein, widths of the respective ring-shaped sub-regions decrease gradually along the direction from the central region of the liquid crystal display panel toward the outer edge of the periphery of the liquid crystal display panel.

7. The liquid crystal display panel according to claim 1, wherein, the spacers are arranged on the array substrate; or, the spacers are arranged on the opposite substrate.

8. The liquid crystal display panel according to claim 1, wherein, the central region is a region which centers on the center of the diagonal of the liquid crystal display panel and has a shape similar to the shape of the liquid crystal display panel, and the peripheral region is divided into a plurality of ring-shaped sub-regions surrounding the central region.

9. The liquid crystal display panel according to claim 4, wherein, the central region is a region which centers on the center of the diagonal of the liquid crystal display panel and has a shape similar to the shape of the liquid crystal display panel, and the peripheral region is divided into a plurality of ring-shaped sub-regions surrounding the central region.

10. A display device, comprising a liquid crystal display panel, the liquid display panel comprising an array substrate and an opposite substrate arranged opposite to each other, and spacers provided between the array substrate and the opposite substrate, wherein:

the liquid crystal display panel is divided into a central region and a peripheral region; the central region includes a center of a diagonal of the liquid crystal display panel and a region around the center of the diagonal, and the peripheral region is a region of the liquid crystal display panel other than the central region;

heights of the spacers within the central region without extending and contracting are set as a first height;

heights of the spacers within the peripheral region without extending and contracting are set as second heights; and the first height is larger than the second heights;

wherein after the array substrate and the opposite substrate are aligned to form a cell, the spacers within the central region and the spacers within the peripheral region have the same height, and wherein the peripheral region is divided into a plurality of ring-shaped sub-regions surrounding the central region along a direction from the central region of the liquid crystal display panel toward outer edge of periphery of the liquid crystal display panel, and the spacers within the same ring-shaped sub-region have the same second height and the second heights of the spacers within the respective ring-shaped sub-regions decrease gradually along the direction from the central region of the liquid crystal display panel toward the outer edge of the periphery of the liquid crystal display panel.

11. The display device according to claim 10, wherein, the spacers are arranged on the array substrate; or, the spacers are arranged on the opposite substrate.

12. The display device according to claim 10, wherein, the central region is a region which centers on the center of the diagonal of the liquid crystal display panel and has a shape similar to the shape of the liquid crystal display panel, and the peripheral region is divided into a plurality of ring-shaped sub-regions surrounding the central region.

* * * * *